(12) United States Patent
Howald

(10) Patent No.: US 6,525,316 B1
(45) Date of Patent: Feb. 25, 2003

(54) MULTIAXIS ACTUATOR AND MEASURING HEAD, ESPECIALLY FOR A SCANNING PROBE MICROSCOPE

(75) Inventor: Lukas E. Howald, Dornach (CH)

(73) Assignee: Nanosurf AG, Liestal (CH)

(*) Notice: Subject to any disclaimer, the term of this patent is extended or adjusted under 35 U.S.C. 154(b) by 0 days.

(21) Appl. No.: 09/520,316

(22) Filed: Mar. 7, 2000

(30) Foreign Application Priority Data

Mar. 9, 1999 (EP) .............................................. 99810208

(51) Int. Cl.⁷ .......................... G01N 27/00; G01B 7/34
(52) U.S. Cl. ....................... 250/306; 250/307; 250/310; 250/442.11
(58) Field of Search ................................ 250/306, 307, 250/310, 311, 442.11, 441.11; 73/104, 105; 324/158

(56) References Cited

U.S. PATENT DOCUMENTS

| | | | | |
|---|---|---|---|---|
| 5,103,095 A | * | 4/1992 | Elings et al. ................ | 250/306 |
| 5,200,617 A | * | 4/1993 | Hayes et al. ................. | 250/306 |
| 5,235,187 A | * | 8/1993 | Arney et al. ................. | 250/306 |
| 5,286,977 A | * | 2/1994 | Yokoyama et al. .... | 250/442.11 |
| 5,500,535 A | * | 3/1996 | Jing ........................ | 250/440.11 |
| 5,801,472 A | * | 9/1998 | Wada et al. ................. | 310/309 |
| 5,877,891 A | * | 3/1999 | Park et al. .................. | 359/372 |
| 6,118,121 A | * | 9/2000 | Ando et al. ................. | 250/306 |

FOREIGN PATENT DOCUMENTS

| | | |
|---|---|---|
| EP | 0389115 | 9/1990 |
| EP | 0763881 | 3/1997 |
| EP | 0778657 | 6/1997 |
| EP | 0807799 | 11/1997 |
| WO | 9607074 | 3/1996 |

OTHER PUBLICATIONS

R. Garcia Cantu; M.A. Huerta Garnica: "Inductoscanner Tunneling Microscope" Surface Science, Bd. 181, 1987, Seiten 216–221.

* cited by examiner

Primary Examiner—John R. Lee
Assistant Examiner—David A. Vanore
(74) Attorney, Agent, or Firm—Bachman & LaPointe, P.C.

(57) ABSTRACT

Finely adjustable actuators are used for positioning a sensor or a scanning tip, especially for scanning tunnelling microscopes and other scanning microscopes, i.e. scanning probe microscopes. The invention relates to the construction of such an actuator which can carry out three-dimensional movements of a scanning tip with high regulating accuracy while being of robust and compact design. This is achieved by a sensible arrangement of a plural number of electromagnetic actuator elements acting on a common rigid sensor carrier. The invention provides a robust and relatively simple solution for positioning the scanning tip; an important and problematic task in scanning probe microscopy and in related fields. It permits positioning at high resolution as well as with a relatively long regulating range. Further advantages include good repetition accuracy and little mass which reduces both energy consumption and interference.

22 Claims, 3 Drawing Sheets

MULTIAXIS ACTUATOR AND MEASURING HEAD, ESPECIALLY FOR A SCANNING PROBE MICROSCOPE

BACKGROUND OF THE INVENTION

1. Technical Field of the Invention

The invention relates to the field of positioning devices, i.e. of finely positionable actuators as for example used for scanning tunnelling microscopes and other scanning microscopes, so-called scanning probe microscopes. In particular, the invention relates to the construction of such a multiaxis actuator which can carry out three-dimensional movements of a sensor or a scanning tip with high regulating accuracy while being of comparatively robust and compact design. Furthermore, the invention relates to a measuring head for a scanning probe microscope comprising such an actuator. Appropriate integration of the actuator results in a robust measuring head which is simple in operation and which has advantages when compared to the state of the art.

2. State of the Art

In scanning probe microscopy, positioning of the scanning tip has been a somewhat problematic task from the very start because such positioning needs to be at the highest possible resolution while maintaining as large a regulating range as possible. In addition, good repeatability, i.e. adjustability as far as possible free of any hysteresis, is required, as is little mass, if for no other reason than that of low energy consumption. When the desire for rational, economical production of a respective measuring head is taken into account as well, it becomes evident why a host of different approaches to solving this problem of positioning scanning tips have been made. Piezo actuators are in use as are for example electromagnetic or electrostatic actuator elements for the actuators. Many of today's scanning probe microscopes (SPMs) use piezo actuators for the necessary fine positioning which takes place in the micrometer to sub-nanometer range. But there are also other approaches as will be shown below.

However advantageous piezo actuators are in several respects, they also have a number of disadvantages, among them in particular the expensive electrical control devices and the comparatively high operating voltages, often in the 100 V or 1000 V range, with the need for respective protective devices. Furthermore, linearity is not always achieved as desired and might have to be improved by applying control technology. In addition, hysteresis can be a problem which is difficult to solve. Furthermore, extended regulating distances which after all are almost always desirable, can only be realized with relatively large arrangements. Nonetheless, due to their comparatively robust design and good value, piezo actuators have established a firm position in the market.

While other attempts at solving the problem have always been pursued, e.g. magnetostrictive, electrostrictive or electrostatic approaches, so far they do not seem to be suitable for large regulating distances, i.e. actuator regulating distances around or in excess of 50 $\mu$m. This has kept a limit on possible applications and therefore also on the interest in such actuators.

By contrast, electromagnetic actuators, often referred to as voice coil arrangements, have attracted considerable interest right from the start. They are used in a host of different applications, above all outside the area of scanning probe microscopy. One such example, from the area of consumer electronics, are CD reading heads which are positioned by multidimensional actuators. Electromagnetic actuators are inherently quite linear, they can cover comparatively large regulating distances up to the mm range, and they can be operated at low voltage. Often a voice coil arrangement with stationary permanent magnet and movable coil is used but other arrangements are also known.

Such an arrangement for use in a scanning probe microscope (or a respective memory) is described by G. Binnig et al in PCT patent application WO 96/07074: "Fine positioning apparatus with atomic resolution". This arrangement provides for two inductive actuator units with a positioning accuracy of better than 1 nm. A mechanical damping device acts as a brake and, together with a special mechanical arrangement, as a variable step-down device of the electromagnetic actuator. While this is intended to improve the positioning accuracy of the entire device, it renders the overall design relatively expensive and heavy. This significantly limits the range of possible applications. Nor is an arrangement in the form shown conducive to economical production. For example, the electrical cables to the movable voice coils also need to be movable which can be problematic for production as well as for reliability.

A further approach was described by S. T. Smith et al in the journal "Rev. Sci. Instruments", vol. 65, no. 4 April 1994, on pages 910 ff., entitled "A simple two-axis ultra-precision actuator". It shows an actuator comprising two actuator units, one of which is used for translatory positioning, the other for angular positioning. Reportedly, translatory distances of 80 $\mu$m have been achieved, with angular ranges of 3.6 mrad being achieved at a positioning accuracy of 0.6 nrad. While this actuator only covers two axes, which would limit its application possibilities, it nevertheless provides a pointer as to what an actuator or relatively simple design might look like. But it must not be overlooked that the actuator shown by S. T. Smith, according to the presentation in the above-mentioned article really only seems suitable for illustrating the theory and general function. It is not well-developed from a production-technology point of view, indeed production-technology considerations do not seem to have featured at all in its design. At any rate it could hardly be considered a model for a robust actuator which is relatively simple to produce. Even more importantly, there is no description as to how the actuator described might be used in three dimensions.

A further, quite interesting approach is shown by R. Garcia Cantu et al in their article "Inductoscanner Tunneling Microscope", in Surface Science 181, pp. 216–221, Elsevier Science Publishers B.V. 1997. The actuator for a scanning tunnelling microscope described comprises a pair of diametrically opposed voice-coil actuator elements with a support, with the scanning tip extending between said actuator elements which are advantageously operated at low voltage. Suspension is via metal membranes, similar to that in an aneroid barometer. The authors do not however demonstrate resolution in the sub-nm range as required for the desired application and thus do not meet the objective set by the invention. Moreover, the selected arrangement of the opposing voice coil actuators appears to be somewhat voluminous and hardly suitable for economical production. In addition, large volume usually results in low self resonance which is not always desirable, and substantial mass and the associated large working surface almost always means a high susceptibility to external interference.

SUMMARY OF THE INVENTION

As can be seen from the above, it is the object of the invention to create a three-dimensionally controllable electromagnetic actuator, in particular for scanning probe microscopes, with said actuator being of comparatively simple and robust construction with regulating distances as large as possible—preferably in the 100 μm range—while at the same time providing good positioning accuracy —preferably in the sub-nm range—and high linearity as far as possible without external feedback, especially without mechanical feedback. In addition, the arrangement should be compact and as simple as possible to produce.

This rather complex object is met in principle relatively simply by the invention by the arrangement of preferably three electromagnetic actuator units arranged in one plane and/or being essentially identical, said actuator units being connected to a rigid fulcrum structure supporting the scanning tip such that said fulcrum structure, depending on the activation of the actuator units, can be tilted on any desired rotary axis in said plane and/or can be moved in a translatory way essentially perpendicularly to said plane, as a result of which the scanning tip, which is situated outside said plane, can be moved in space quasi in any way desired.

It would be advantageous, but this is not a condition, if the three actuator units were to act in the same direction of action and in addition, if they were positioned in a suitable plane. In this way, the spring provided for each actuator unit could be advantageously configured as a part of a diaphragm spring shared by all actuator units, thus reducing construction expenditure. Below, further advantageous embodiments are shown in the description of an embodiment and in the claims.

BRIEF DESCRIPTION OF THE DRAWINGS

One embodiment of the invention is described in conjunction with the drawings, as follows.

DETAILED DESCRIPTION OF PREFERRED EMBODIMENTS

Figure 1:
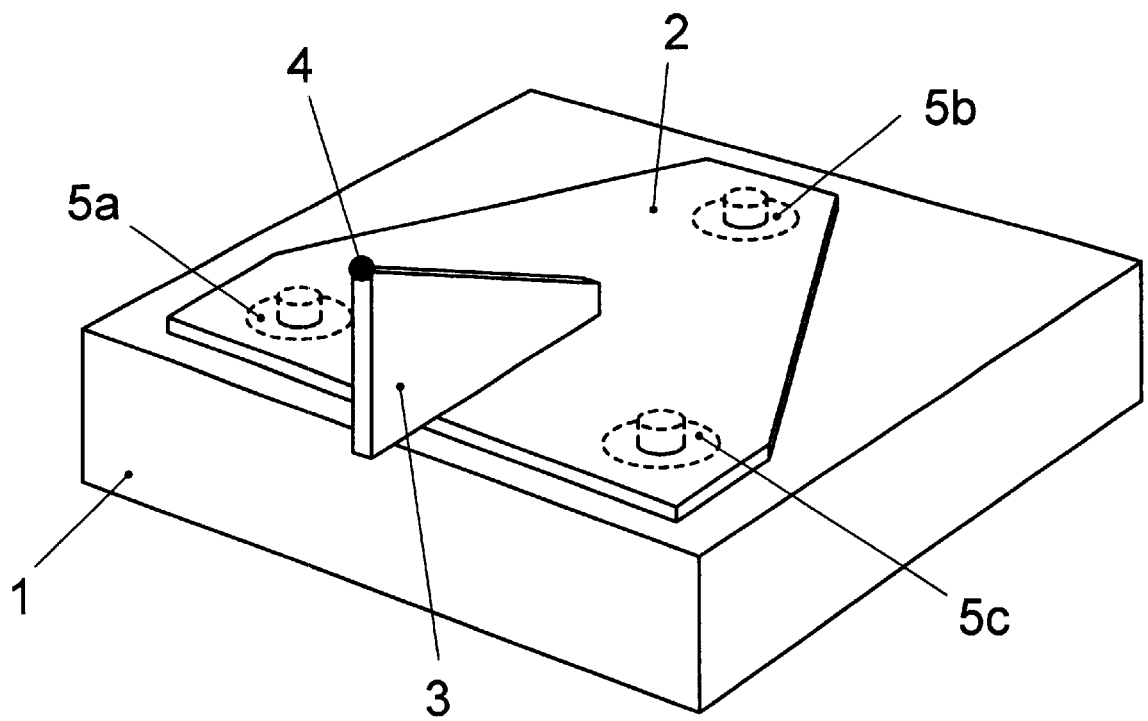
FIG. 1 is an overall view of an actuator according to the invention.
Figure 2:
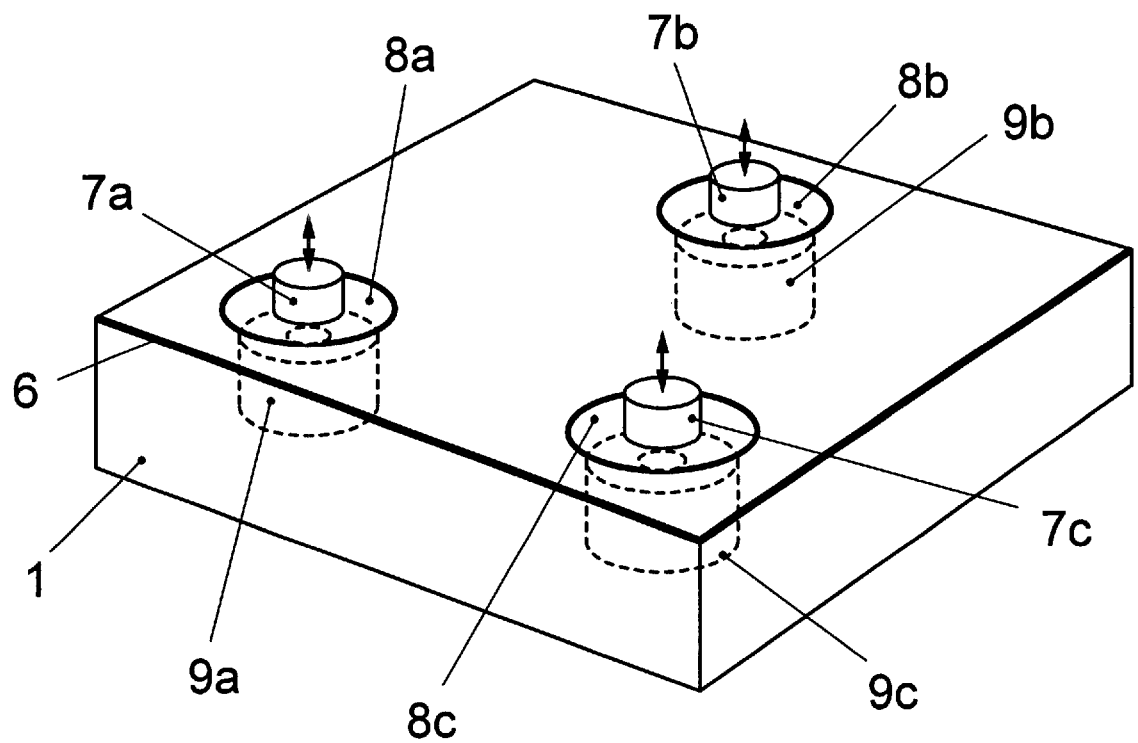
FIG. 2 shows details of the actuator shown in FIG. 1.
Figure 3:
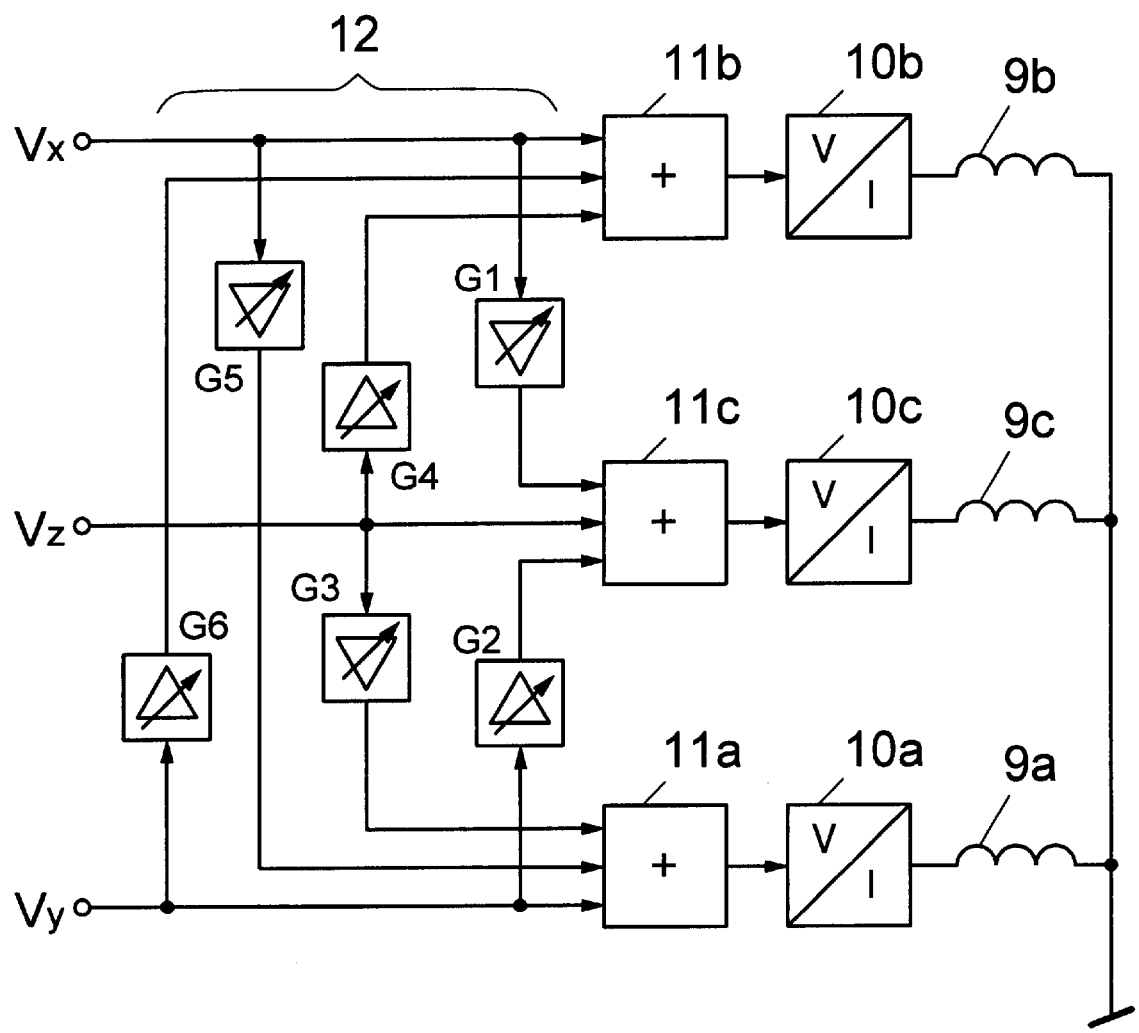
FIG. 3 is an example of an electrical control circuit.

List of References
FIG. 1
1 Housing
2 Fulcrum frame
3 Tip holder
4 Scanning tip
5a, 5b, 5c Actuator unit
FIG. 2 (in addition)
6 Diaphragm spring
7a, 7b, 7c Permanent magnet
8a, 8b, 8c Spring element
9a, 9b, 9c Coil
FIG. 3 (in addition)
10a, 10b, 10c U/I transducer
11a, 11b, 11c Adding device
12 Amplifier group
Vx, Vy, Vz Input terminal FIG. 1 is an overall view showing the essential components of the preferred embodiment of the actuator according to the invention. In or on a housing 1, three actuator units 5a to 5c are essentially arranged in one plane, with the movable parts (shown in more detail in FIG. 2) of said actuator units 5a to 5c being rigidly connected to a fulcrum frame 2. At the top of said fulcrum frame 2 and connected to it, there is a tip holder 3 which tapers off to a scanning tip 4. According to the object of the invention, this scanning tip is to be positioned at high accuracy in all three spatial directions on the workpiece (not shown) to be scanned.

This positioning takes place by tilting and/or sliding the fulcrum frame 2 by means of the actuator units 5a to 5c, each one of which is individually controllable electrically. If for example the two actuator units 5a and 5c are blocked and only the actuator unit 5b is driven, then tilting of the fulcrum frame 2 around an axis 5a–5c takes place. As a result of this, the scanning tip 4 describes an arc of a circle centred on said axis 5a–5c. If all three actuator units are driven equally, the fulcrum frames 2 and the scanning tip 4 describe a translatory movement perpendicular to the surface of the housing, or to the plane of the three actuator units. It becomes obvious that by suitable driving of the three actuator units, within certain limits any desired tilting movement of the fulcrum frame can be carried out around almost any desired axis of rotation. The above-mentioned translatory movement can be added to this. To carry out such movement, it is merely necessary to calculate and co-ordinate the amounts, i.e. the deflections of the actuator units. This will be explained below by way of an example.

FIG. 2 shows in particular in more detail the actuator units 5a to 5c, with fulcrum frame 2, tip holder 3 and scanning tip 4 not shown. The housing 1 is capped by a diaphragm spring 6 which in those positions, where there is an actuator unit 5a to 5c, is configured as a spring element 8a to 8c. Said spring elements can, for example, be in the form of spiral slots in the diaphragm spring 6. At each of these spring elements 8a to 8c, a permanent magnet 7a to 7c is attached which acts in conjunction with a coil 9a to 9c arranged in the housing 1. By electrically driving each of these coils, exactly controllable excursion or deflection of the permanent magnet takes place (and thus the movement of the fulcrum frame, not shown in FIG. 2, as explained above in the context of FIG. 1).

According to a preferred embodiment, the actuator units are arranged and operated such that the scanning tip 4 can be moved in three spatial directions orthogonal to each other. The spatial arrangement of the actuator units 5a to 5c and the mix ratio of the movement contributions made by said actuator units determine the orthogonality of the scanning tip movement generated. From a spatial point of view, for example, an arrangement of the three actuator units at the corner points of an isosceles triangle has been shown to be particularly suitable. Fine adjustment can take place either mechanically by respective adjustment devices on two or all three actuator units, or by electrical or electronic means in that the mix ratio of the currents through the coils 9a to 9c is balanced accordingly. It is also possible to combine these two methods of mechanical and electrical adjustment.

The following is one example of an orthogonal arrangement. At a distance of 12 mm between the two actuator units 5a and 5c, the perpendicular distance to it of the scanning tip 4 is 6 mm. Movement of the scanning tip 4 parallel to a plane extending through 5a–5c and perpendicular to the diaphragm spring 6, is now for example generated by a "full" deflection of one of the actuator units 5a or 5c (the respective other actuator unit remains motionless) and "half" a deflection of the actuator unit 5b. As an alternative, actuator unit 5b can be held in place while the two actuator units 5a and 5c can be moved in opposite direction around the same deflections.

Movement of the scanning tip 4 parallel to a plane extending through said scanning tip itself and 5b and perpendicular to the diaphragm spring 6 is for example generated by a particular "full deflection" of the actuator unit 5b and a partial deflection, for example a "half" deflection of each of the actuator units 5a and 5c. It becomes obvious that the ratio of deflections of the three actuator units 5a to 5c permits precise control of the scanning tip 4.

If the three actuator units 5a to 5c are driven in a quasi parallel way, such that they carry out deflections of the same size, then the diaphragm spring 6 moves up or down parallel to itself and with it the scanning tip 4.

Of particular interest is the damping action which is generally required, especially in the case of scanning microscopes. Here too, the embodiment according to the invention is particularly advantageous. By using the design of a practically closed housing, it is possible to use a liquid viscous damping medium in the housing 1, said damping medium being used to mechanically dampen the oscillations of the diaphragm spring 6. Damping polymers could also be considered for this task.

As an alternative or in addition, active electrical damping can take place by designing the electrical controls accordingly. Controls suitable for this are known in principle, e.g. from electro-acoustics, for damping the self resonance of loudspeakers. The necessary adaptations required in the present case should not pose any difficulties to persons skilled in the art.

So as to provide an impression of the physical size of an embodiment and the electrical values, a few details and exemplary dimensions are provided below, which can of course be changed almost without limits by a person skilled in the art. In an arrangement made for laboratory purposes, the housing 1 is fade of metal, with the dimensions LWH being approx. 20 mm×18 mm×6 mm. The three actuator units 5a to 5c are constructed identically, being arranged at the corner points of an isosceles (almost equilateral) triangle with an edge width of 11 and 12 mm. The size of the metal fulcrum frame 2 corresponds to these measures; its shape can be as shown in FIG. 1 but it is practically irrelevant except for the distance between the scanning tip 4 and the diaphragm spring 6 (described in detail later). Said distance is 6 mm.

At the open side of the housing 1, a non-magnetic diaphragm spring 6, preferably metallic, is arranged. Within the housing, three coils 9a to 9c forming part of the actuator units 5a to 5c are attached, with each of said coils carrying several thousand windings on a coil body measuring a few mm in diameter. The coil may either be without a core (air-core coil) or with a core made of magnetic material, as desired. If a core is used, the effectiveness of the coil is improved but at the same time certain non-linearity is introduced. Opposite each coil there is a permanent magnet 7a to 7c, each of which is attached to a spring element 8a to 8c in said diaphragm spring 6. The permanent magnets 7a to 7c are of cylindrical shape, with a height of a few mm and a comparable diameter. In the rest position without any excursion, the distance between the permanent magnets 7a to 7c and the coils 9a to 9c is less than 1 mm. The operating voltage of the actuator units 5a to 5c is +/−12 V.

The housing 1 can be closed off by a housing lid (not shown in the figures) which comprises only a comparatively small aperture for the tip holder 3. In this way, exterior interference, for example acoustic or magnetic interference, is reduced or entirely suppressed; it can then not cause any distortion of the measurements. Furthermore, such a housing lid can serve as a mechanical end stop for the moving parts, in particular for the diaphragm spring 6, thus preventing damage to the arrangement as a result of improper handling or undesired mechanical influences.

FIG. 3 is a diagrammatic representation of the electrical control for driving the three actuator units. The electrical control is described based on the coils 9a to 9c shown in FIG. 2, of the actuator units. The coils are connected to the mass and at the same time each of the 1s coils 9a to 9c is fed by a voltage/current transformer (U/I transducer) 10a to 10c because of the temperature dependence of the coil resistance and the inevitable heating up of each coil during operation. The input voltages required for these voltage/current transducers are derived from the three adding devices 11a to 11c, with each of said adding devices being supplied with three input voltages (to be added) by the amplifier system 12. In the example shown, the amplifier system 12 comprises six controllable voltage amplifiers G1 to G6 which are fed by three input voltages present at the input terminals Vx, Vy and Vz. As shown, each of the adding devices 11a to 11c is directly connected to one of the input terminals and, via an amplifier each, to the two other input terminals. In this way, any desired voltage mix ratios can be generated at the inputs of the three voltage/current transducers 10a to 10c and thus the coils 9a to 9c of the three actuator units can be selected as desired. Of course this simple and robust circuit can be modified to create the same or a similar effect. This should pose no problem to a person versed in the art.

This relative simplicity and robustness both from a mechanical and electrical point of view obviously renders the arrangement according to the invention suitable also for fine positioning in fields other than scanning microscopy. For example in robot-controlled production, similarly precise movement controls are often required, for example in micro-mechanics. In the field of medical operations, too, there are tasks for which the solution according to the invention appears applicable. A person versed in the art should not find it difficult to modify the embodiment which has been described in the context of a microscope measuring head, such that it is suitable for similar fine positioning in other areas and thus leads to the same advantages as described in the above application. For example, it could be imagined that the arrangement for a microscope is reversed so that the specimen to be examined is arranged on the actuator while the probe or scanning tip is arranged so as to be stationary. Such variations are to be encompassed by the present invention.

What is claimed is:

1. An actuator for controlled spatial movement of a sensor comprising: a plurality of electromagnetic actuator units for scanning said sensor over a surface and a frame connecting said actuator units; characterized in that:

said plurality of actuator units are arranged in a common housing in one plane;

each of said plurality of actuator units comprises a resiliently held, movable part and a part fixed to, or fixed in, the housing;

said movable parts of said plurality of actuator units are connected by a common rigid frame to which said sensor is attached, so that controlled spatial movement of said frame over said surface can be carried out by driving said actuator units.

2. The actuator according to claim 1, wherein said actuator units are electromagnetic actuator units.

3. The actuator according to claim 1, wherein at least three actuator units are provided which are arranged in one plane in the common housing.

4. The actuator according to claim 1, wherein:

the actuator units are configured as electromagnetic units, with the fixed part of an actuator unit comprising a coil attached inside the housing; and wherein the movable part of an actuator unit comprises a resiliently suspended permanent magnet.

5. The actuator according to claim 1, wherein at least one elastic element is provided which extends at least in part along the entire housing, said element carrying at least one part of an actuator unit.

6. The actuator according to claim 5, wherein:

the elastic element is configured as a diaphragm extending along the housing, and comprises at least one resilient section to which a movable part of an actuator unit is fixed.

7. The actuator according to claim 1, wherein the elastic element:

consists of uniform elastic material;

extends at least approximately parallel to the plane of the actuator units;

includes a circumference and at the circumference is at least partly attached to the housing; and comprises several resilient sections, said sections being formed by respective recesses in the material.

8. The actuator according to claim 7, including one resilient section for each movable part of an actuator unit.

9. The actuator according to claim 1, wherein the frame connecting the movable parts of the actuator units is a plane plate which extends at least approximately parallel to the plane of the actuator units, with a holder for the sensor being attached, said holder extending outside said plane.

10. The actuator according to claim 9, including a housing closure which covers at least a part of the movable parts of the actuator, said housing closure comprising an aperture for the outward extending holder.

11. The actuator according to claim 10, wherein said housing closure optionally serves as a mechanical end stop for the movable parts.

12. The actuator according to claim 1, including three actuator units which spatially describe an isosceles triangle, across whose base extends a holder carrying the sensor.

13. The actuator according to claim 12, wherein the base of the isosceles triangle is longer than the two equal sides.

14. The actuator according to claim 1, wherein means for damping of a self resonance are provided, said means selected from the group consisting of mechanical means and electrical means.

15. The actuator according to claim 14, wherein mechanical damping of the self resonance occurs by means of a viscous damping medium in the housing.

16. The actuator according to claim 15, wherein the viscous damping medium is one of a liquid and polymer damping medium.

17. The actuator according to claim 1, wherein:

the actuator units are configured as electromagnetic units, with the fixed part of an actuator unit comprising a permanent magnet inside the housing; and the movable part of an actuator unit comprising a resiliently suspended coil.

18. A plurality of actuator according to claim 1 integrated into a measuring head for a scanning probe microscope, whereby:

the movable part of each of said actuator is connected to a common movable, but intrinsically rigid, frame carrying a scanning tip;

said plurality of actuators causing a scanning movement of said frame with said scanning tip, and an electrical control device is provided by means of which said actuators can be driven in a co-ordinated way such that a desired scanning movement of said scanning tip is generated.

19. The plurality of actuators according to claim 18, wherein at least three of said actuators are arranged in one plane.

20. The plurality of actuators according to claim 19, wherein the movable parts of each actuator are operable by the electrical control device such that the scanning tip can be moved in three orthogonal spatial directions.

21. The plurality of actuators according to claim 19, wherein:

the actuators are electromagnetic units; and a part of an actuator which is fixed in relation to the measuring head is a coil driven by a power source.

22. The plurality of actuators according to claim 19, wherein:

the plurality of said actuators are electromagnetic units; and a part of an actuator which is movable in relation to the measuring head is a coil driven by a power source.

* * * * *